US008736752B2

(12) United States Patent
Hachisu et al.

(10) Patent No.: US 8,736,752 B2
(45) Date of Patent: May 27, 2014

(54) IMAGING DEVICE AND POWER SUPPLY CONTROL METHOD OF IMAGING DEVICE

(75) Inventors: Kenji Hachisu, Tokyo (JP); Manabu Shimizu, Kanagawa (JP); Tomonori Agawa, Kanagawa (JP)

(73) Assignee: Sony Corporation (JP)

( * ) Notice: Subject to any disclaimer, the term of this patent is extended or adjusted under 35 U.S.C. 154(b) by 29 days.

(21) Appl. No.: 12/931,542

(22) Filed: Feb. 3, 2011

(65) Prior Publication Data

US 2011/0194002 A1    Aug. 11, 2011

(30) Foreign Application Priority Data

Feb. 10, 2010   (JP) ............................... P2010-027580

(51) Int. Cl.
*H04N 5/225* (2006.01)
*H04N 7/00* (2011.01)
*H04N 7/18* (2006.01)
*H04N 5/222* (2006.01)

(52) U.S. Cl.
USPC ....... 348/372; 348/148; 348/118; 348/333.13

(58) Field of Classification Search
USPC .................................. 348/118, 148, 294, 372
See application file for complete search history.

(56) References Cited

U.S. PATENT DOCUMENTS

| 2003/0081142 | A1* | 5/2003 | Iijima ........................... 348/372 |
| 2006/0115120 | A1* | 6/2006 | Taniguchi et al. ............ 382/104 |
| 2007/0236364 | A1* | 10/2007 | Hubbard et al. ........... 340/932.2 |
| 2008/0036904 | A1* | 2/2008 | Taneoka ........................ 348/372 |
| 2010/0066890 | A1* | 3/2010 | Ueda et al. ............... 348/333.02 |

FOREIGN PATENT DOCUMENTS

| JP | 07-236134 A | | 9/1995 | |
| JP | 11-055656 | * | 2/1999 | ............... H04N 7/18 |
| JP | 11-055656 A | | 2/1999 | |

* cited by examiner

*Primary Examiner* — Roberto Velez
*Assistant Examiner* — Stephen Coleman
(74) *Attorney, Agent, or Firm* — Lerner, David, Littenberg, Krumholz & Mentlik, LLP

(57) ABSTRACT

Imaging device includes an imaging element for receiving light from a subject and converting the light to an electric signal, a video signal processing circuit for performing signal processing on a video signal generated based on the electric signal, a power supply circuit for supplying power to the video signal processing circuit, a signal detection unit for receiving a backup lamp signal indicating light-on or light-off of a backup lamp from the backup lamp installed at a back part of a vehicle, and a power supply control unit for controlling the power supply circuit based on the backup lamp signal so that the supply of power is turned ON in time of light-on of the backup lamp, the supply of power is turned ON for a preset time after the light-off of the backup lamp, and the supply of power is turned OFF after the preset time has elapsed.

9 Claims, 10 Drawing Sheets

IMAGING DEVICE AND POWER SUPPLY CONTROL METHOD OF IMAGING DEVICE

CROSS-REFERENCE TO RELATED APPLICATION

The present application claims priority from Japanese Patent Application No. JP 2010-027580 filed in the Japanese Patent Office on Feb. 10, 2010, the entire content of which is incorporated herein by reference.

BACKGROUND OF THE INVENTION

1. Field of the Invention

The present invention relates to an imaging device and a power supply control method of the imaging device.

2. Description of the Related Art

A camera system is known in which a backup camera for taking photographs of the back side of an automobile is installed at a back part of the automobile so that the driver can check the back side of the automobile on a screen installed inside the vehicle. The images taken by the backup camera are displayed on a display of a car navigation device or displayed on a display installed at the position of the back mirror when the automobile is moving backward.

An example shown in FIG. 7 is a camera system 1 in which a camera 50 for taking photographs of the back side of the automobile is connected to a car navigation device 20. FIG. 7 is a block diagram showing a camera system 1 of the related art. The camera 50 includes a camera power supply circuit 54, a video signal processing circuit (DSP) 56, a CCD image sensor 58, a video driver 59, and the like. The car navigation device 20 includes a control unit 22, a display 24, and the like. In the camera system 1, a rear gear detection unit 12 detects the state of a gear 10 and outputs a rear gear ON signal, indicating whether or not the gear 10 is in a rear state, and the control unit 22 of the car navigation device 20 controls ON/OFF of the power of the camera 50 based on the rear gear ON signal. At the same time, the control unit 22 of the car navigation device 20 controls display or non-display of the display 24.

An example shown in FIG. 8 is a camera system 2 in which a vehicle is not mounted with the car navigation device and a camera 50 and a display 40 are connected. FIG. 8 is a block diagram showing a camera system 2 of the related art. In the camera system 2, the camera 50 is connected to a battery 30 and is conducted on a steady basis. The display or non-display of the display 40 is controlled when the display 40 detects the state of the gear of the vehicle based on the rear gear ON signal.

Japanese Patent Application Laid-Open No. 11-55656 discloses detecting a signal of a rear gear, a backup lamp, or the like, and having a display device switch the display of the video from a camera and another external video.

In Japanese Patent Application Laid-Open No. 7-236134 discloses a camera system 3 in which the camera 50 includes a power supply control unit 52 (=relay circuit), a camera power supply circuit 54, a video signal processing circuit 56, a CCD image sensor 58, and the like as shown in FIG. 9. FIG. 9 is a block diagram showing a camera system 3 of the related art. The camera power supply circuit 54 supplies driving power to the camera 50 by the input of the rear gear ON signal. The camera 50 and the display 40 are connected with a connection cable for transmitting video signals.

SUMMARY OF THE INVENTION

In the example shown in FIG. 7, the ON/OFF control of the camera 50 depends on the car navigation device 20, and the camera 50 does not have the function related to the power ON/OFF control of the camera 50 itself. Thus, the function related to the power ON/OFF control of the camera 50 is to be provided to the car navigation device 20 in order to perform the power ON/OFF control of the camera 50.

In the example shown in FIG. 8, the load of the battery 30 due to consuming current may not be eliminated as the camera 50 is used in a conductive state on a steady basis. The internal temperature also rises due to heat generation of the camera 50 itself. Furthermore, as the camera 50 is conducted although it is not being used as the imaging device when the display of the video of the back side of the automobile is not necessary, the conduction time increases thereby affecting the lifespan of the product.

In Japanese Patent Application Laid-Open No. 7-236134, the supply of the driving power of the camera 50 is based on the input of the rear gear ON signal. However, a signal cable is to be wired from the gear 10 to the camera 50 installed at the back part of the automobile to input the rear gear ON signal to the camera 50, which causes the cable length to be long.

In light of the foregoing, it is desirable to provide a novel and improved imaging device in which the camera itself can carry out the power ON/OFF control of the camera instead of an external device and in which the load of the battery can be reduced while shortening the cable length and achieving lighter weight of the vehicle, and a power supply control method of the imaging device.

According to an embodiment of the present invention, there is provided an imaging device which includes an imaging element for receiving light from a subject and converting the light to an electric signal, a video signal processing circuit for performing signal processing on a video signal generated based on the electric signal, a power supply circuit for supplying power to the video signal processing circuit, a signal detection unit for receiving a backup lamp signal indicating light-on or light-off of a backup lamp from the backup lamp installed at a back part of a vehicle, and a power supply control unit for controlling the power supply circuit based on the backup lamp signal so that the supply of power is turned ON in time of light-on of the backup lamp, the supply of power is turned ON for a preset time after the light-off of the backup lamp, and the supply of power is turned OFF after the preset time has elapsed.

The imaging device may further include a timer for counting an elapsed time after the light-off of the backup lamp based on the backup lamp signal, and outputting a time elapse signal indicating that the preset time has elapsed to the power supply control unit. The power supply control unit may control the power supply circuit based on the time elapse signal.

The timer may be arranged in the video signal processing circuit. A time of turning ON the supply of power after the light-off of the backup lamp may be set in the timer.

The power supply circuit may be arranged while connected to an external battery, and turns ON an output voltage when turning ON the supply of power and turns OFF the output voltage when turning OFF the supply of power.

According to an embodiment of the present invention, there is provided a power supply control method of an imaging device which includes the steps of a signal detection unit receiving a backup lamp signal indicating light-on or light-off of a backup lamp from the backup lamp installed at a back part of a vehicle, a power supply circuit turning ON supply of power with respect to a video signal processing circuit, which performs signal processing on a video signal generated based on an electric signal converted by an imaging element upon receiving light from a subject, in time of the light-on of the backup lamp based on the backup lamp signal, the power supply circuit turning ON the supply of power with respect to the video signal processing circuit for a preset time after the light-off of the backup lamp, and the power supply circuit turning OFF the supply of power with respect to the video signal processing circuit after the preset time has elapsed.

According to the present invention, as described above, a camera itself can carry out the power ON/OFF control of the camera instead of an external device and the load of the battery can be reduced while shortening the cable length and achieving lighter weight of the vehicle.

DETAILED DESCRIPTION

Figure 1:
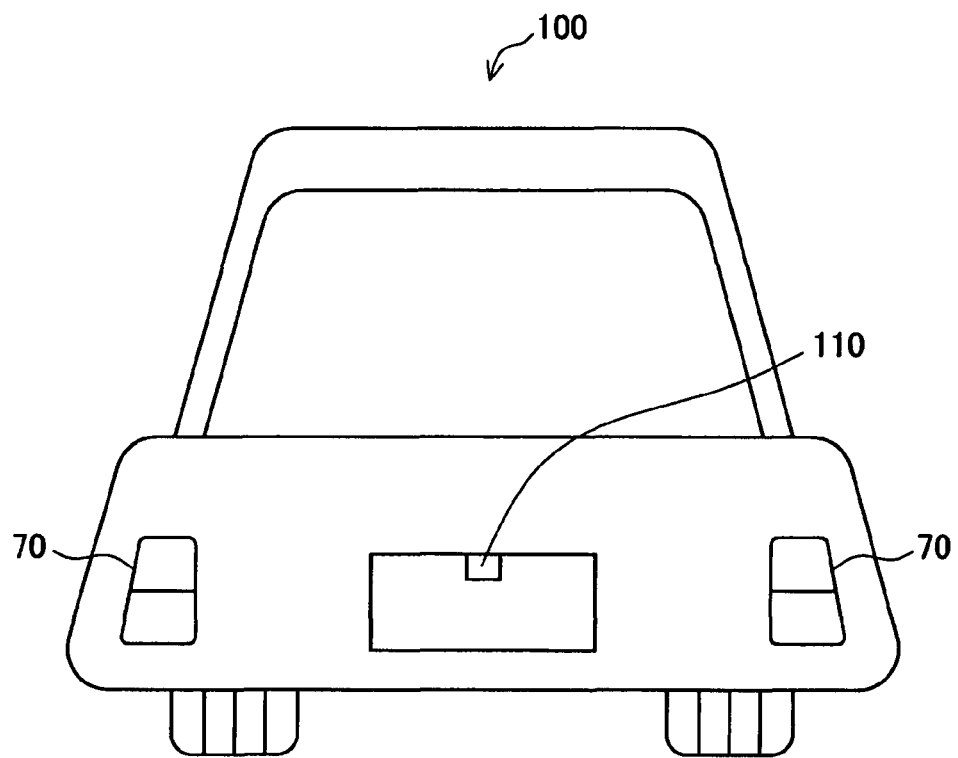
FIG. 1 is an outer appearance view showing a back part of an automobile 100.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Configuration of one embodiment
2. Operation of one embodiment
<1. Configuration of One Embodiment>
[Outer Appearance Example of Camera 110]

First, an outer appearance example of a camera 110 according to one embodiment of the present invention will be described with reference to FIG. 1. FIG. 1 is an outer appearance view showing the back part of an automobile 100.

The camera 110 and a backup lamp 70 are arranged at the back part of the automobile 100 as shown in FIG. 1.

The camera 110 is a backup camera (Backup Camera or Rear View Camera) that takes photographs of the back side of the automobile 100. The video taken by the camera 110 is displayed on a display installed inside the vehicle when the automobile 100 moves backward thereby providing a subject image of the back side of the automobile 100 to the driver and supporting the backward driving.

The backup lamp 70 (Reversing lamp or Backup light) emits light to the back side of the automobile 100 when the automobile 100 moves backward thereby notifying other drivers, pedestrians and the like at the back side of the automobile 100 that the automobile 100 is moving backward.

The camera 110 and the backup lamp 70 are connected with a signal cable for sending a signal indicating light-on or light-off of the backup lamp 70 from the backup lamp 70 to the camera 110. The cable for connecting the camera 110 and the backup lamp 70 may be short compared to a signal cable for connecting the camera 110 and the gear, since the camera 110 and the backup lamp 70 are both installed at the back part of the automobile 100.

[Configuration of Camera 110]

Figure 2:
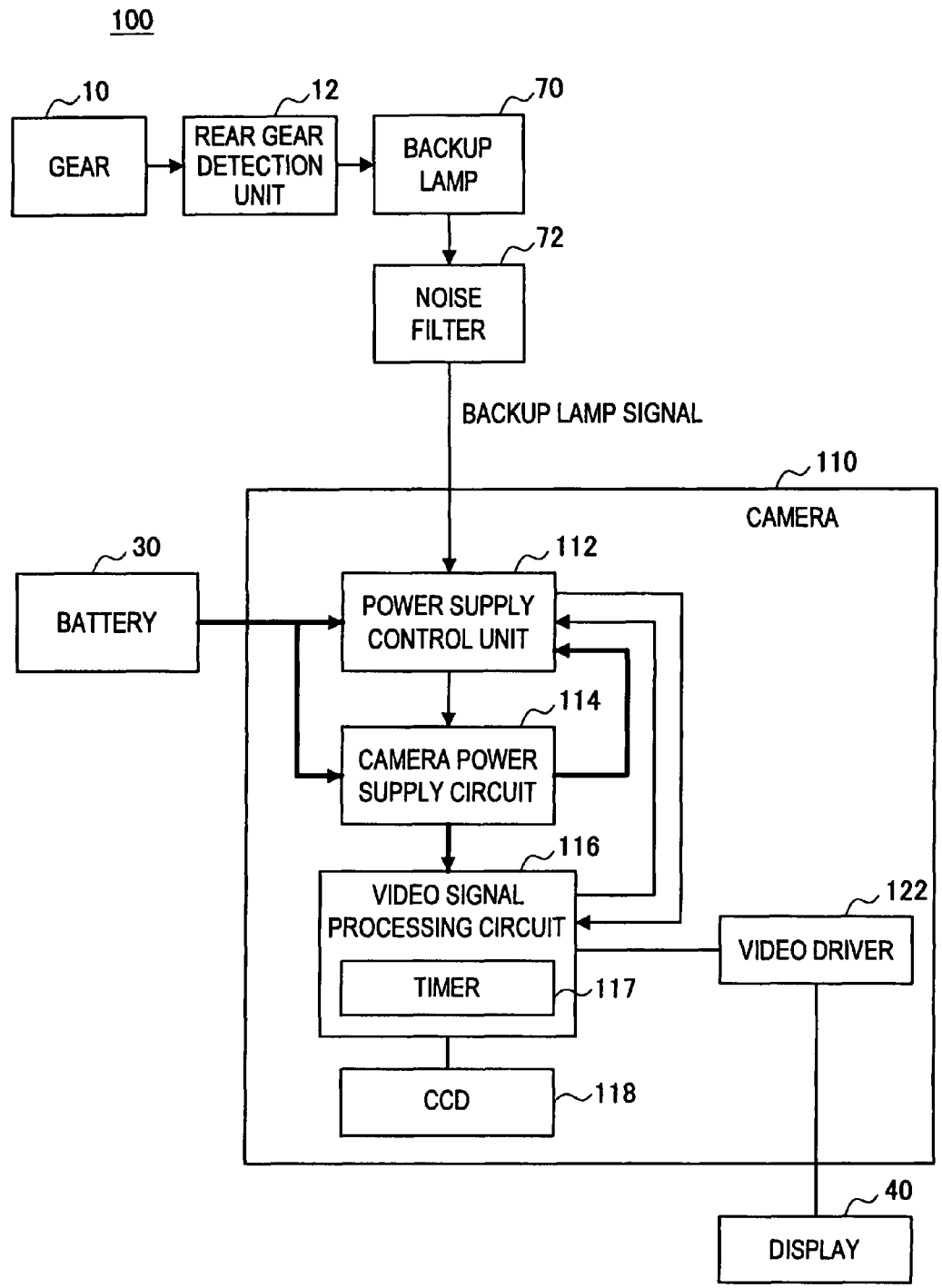
FIG. 2 is a block diagram showing a camera 110 and a camera system including the camera 110 according to one embodiment of the present invention.

The configuration of the camera 110 and the camera system including the camera 110 according to the present embodiment will now be described with reference to FIG. 2. FIG. 2 is a block diagram showing the camera 110 and the camera system including the camera 110 according to the present embodiment.

As shown in FIG. 2, an automobile 100 is installed with a gear 10, a rear gear detection unit 12, the backup lamp 70, a noise filter 72, a display 40, and the camera 110 to configure the camera system.

The rear gear detection unit 12 detects the switching of the gear 10 from a state other than rear to rear (reverse) or the switching of the gear 10 from a state of rear to a state other than rear. The rear gear detection unit 12 outputs a rear gear signal, indicating that the gear 10 is in the state of rear, according to the state of the gear 10.

The backup lamp 70 is turned ON when the gear 10 is in the rear state and turned OFF when the gear 10 is in the state other than the rear upon receiving the rear gear signal from the rear gear detection unit 12. The backup lamp 70 outputs a backup lamp signal indicating light-on or light-off of the backup lamp 70. The backup lamp signal is output to the camera 110 through the noise filter 72. The noise filter prevents noise from entering the backup lamp signal or noise from leaking outside.

The battery 30 is a power supply mounted on the automobile 100, and supplies power to each constituent element of the automobile that needs power such as the camera 110. In the present embodiment, the battery 30 and the camera 110 are directly connected without an external device such as the display 40 and the car navigation device, so that power is directly supplied from the battery 30 to the camera 110. The camera 110 itself thus can control the ON/OFF of the power supply of the camera 110, and the external device such as the display 40 and the car navigation device do not need to control the ON/OFF of the power supply of the camera 110.

The display 40 displays a subject image taken by the camera 110 upon receiving a video signal from the camera 110. When the power supply of the camera 110 is in the ON state, the camera 110 outputs the video signal to the display 40, and the display 40 displays the video from the camera 110. When the power supply of the camera 110 is in the OFF state, the camera 110 does not output the video signal, and the display 40 does not display the video from the camera 110. Thus, the display or the non-display of the video from the camera 110 at the display 40 is controlled by the ON/OFF of the power supply of the camera 110.

As shown in FIG. 2, the camera 110 includes, for example, a power supply control unit 112, a camera power supply circuit 114, a video signal processing circuit 116, a CCD image sensor 118, and a video driver 122.

The power supply control unit 112 controls the camera power supply circuit 114 based on the backup lamp signal. The power supply control unit 112 controls the camera power supply circuit 114 so as to turn ON the supply of power when the backup lamp 70 is turned ON. The power supply control unit 112 controls the camera power supply circuit 114 so as to turn ON the supply of power for a preset time after the backup lamp 70 is turned OFF, and turn OFF the supply of power after the preset time has elapsed. The preset time is a period from a few seconds to more than dozen seconds.

The camera power supply circuit 114 is connected to the battery 30, and supplies power to each constituent element of the camera 110 such as the video signal processing circuit 116. The ON/OFF of the supply of power by the camera power supply circuit 114 is carried out based on the control of the power supply control unit 112. The camera power supply circuit 114 is arranged while connected to the external battery 30. The power supply control unit 112 turns ON the camera power supply circuit 114 when the supply of power is necessary and the supply of power is turned ON, and turns OFF the camera power supply circuit 114 when the supply of power is not necessary and the supply of power is turned OFF. The camera power supply circuit 114 outputs the voltage from the camera power supply circuit 114 when turned ON, and does not output the voltage from the camera power supply circuit 114 when turned OFF. In the present embodiment, the camera power supply circuit 114 is controlled to ON/OFF control the voltage output instead of connecting or disconnecting the battery 30 and the camera power supply circuit 114.

The video signal processing circuit 116 performs various types of signal processing on the video signal based on an electric signal generated in the CCD image sensor 118. The normal technique can be applied to the signal processing in the video signal processing circuit 116, and thus the detailed description thereof will be omitted in the specification. The video signal processing circuit 116 is a micro-computer, for example, and includes a timer 117. The timer 117 counts the elapsed time after the backup lamp 70 is turned OFF based on the backup lamp signal, and outputs a time elapse signal, indicating that the preset time has elapsed, to the power supply control unit 112. The time for turning ON the supply of power after the backup lamp 70 is turned OFF is set in the timer 117.

The CCD image sensor 118 serves as an example of an imaging element that receives light from the subject and converts the light received from the subject to an electric signal. The CCD image sensor 118 outputs the generated electric signal to the video signal processing circuit 116, and the like.

The video driver 122 receives the video signal from the video signal processing circuit 116, and generates a display signal for displaying the video on the display 40. The video driver 122 outputs the generated display signal to the display 40.

[Power Supply Control Unit 112]

Figure 3:
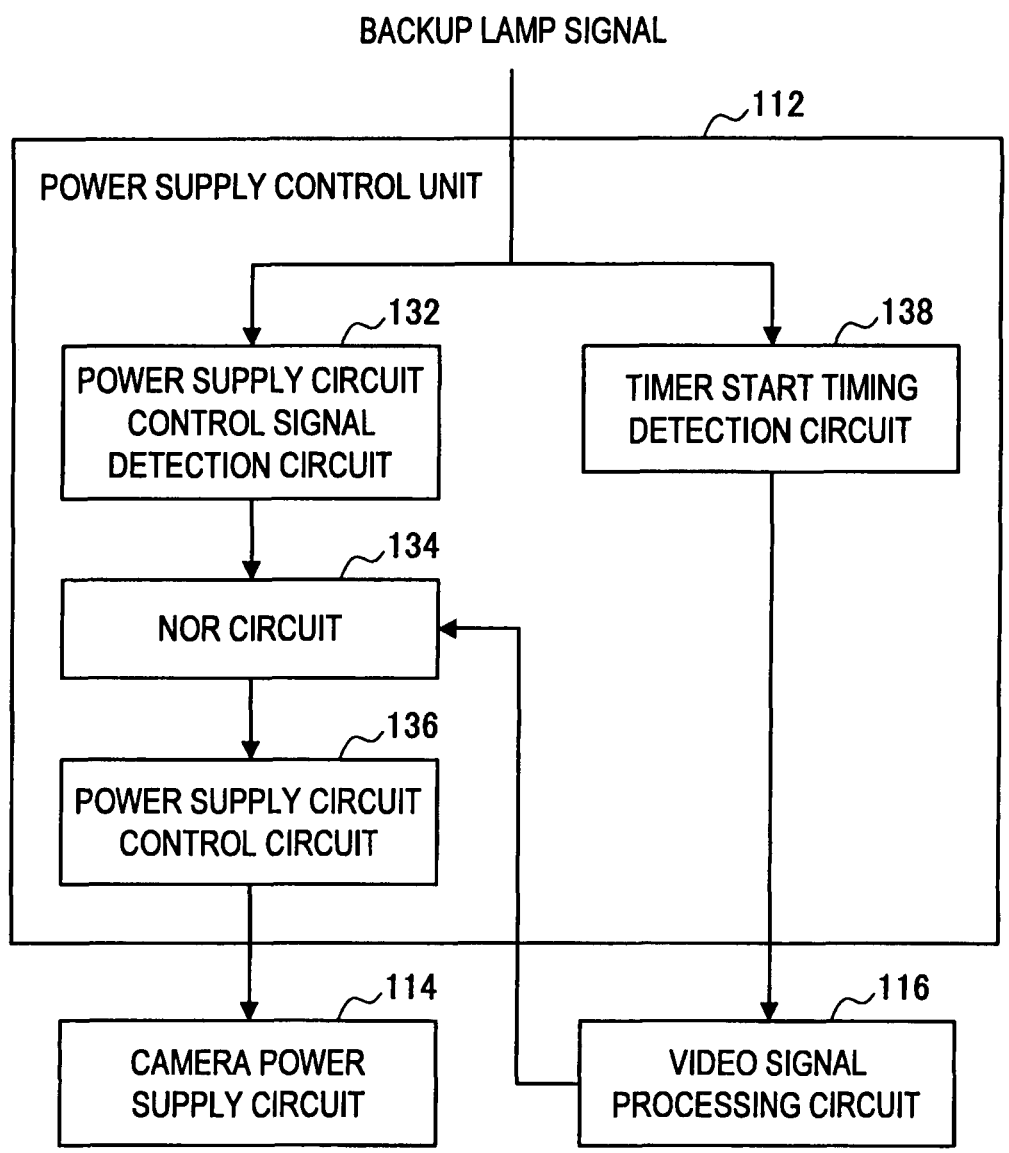
FIG. 3 is a block diagram showing a power supply control unit 112 of the camera 110 according to the embodiment.

The power supply control unit 112 of the camera 110 according to the present embodiment will be described below with reference to FIG. 3. FIG. 3 is a block diagram showing the power supply control unit 112 of the camera 110 according to the present embodiment.

The power supply control unit 112 includes a power supply circuit control signal detection circuit 132, an NOR circuit 134, a power supply circuit control circuit 136, a timer start timing detection circuit 138, and the like.

The power supply circuit control signal detection circuit 132 receives the backup lamp signal and detects whether the backup lamp 70 is turned ON or the backup lamp 70 is turned OFF. The power supply circuit control signal detection circuit 132 outputs the detection result to the NOR circuit 134. The power supply circuit control signal detection circuit 132 outputs True when the backup lamp 70 is turned ON, and outputs False when the backup lamp 70 is turned OFF.

The timer start timing detection circuit 138 serves as an example of a signal detection unit that receives the backup lamp signal and detects whether the backup lamp 70 is turned ON or the backup lamp 70 is turned OFF. The timer start timing detection circuit 138 outputs a start signal to the video signal processing circuit 116 when the backup lamp is turned OFF. The timer 117 of the video signal processing circuit 116 starts to count the elapsed time based on the start signal output from the timer start timing detection circuit 138.

The timer 117 of the video signal processing circuit 116 outputs True when the backup lamp 70 is turned ON and the count of the elapsed time is stopped. The timer 117 also outputs True when the count of the elapsed time has started and before the preset time has elapsed, and outputs False after the preset time has elapsed.

The NOR circuit 134 is a circuit realizing negation of logical addition. The NOR circuit 134 outputs True only when two inputs are False. The NOR circuit 134 receives the signal from the power supply circuit control signal detection circuit 132 and the signal from the video signal processing circuit 116.

When the backup lamp 70 is turned ON and the timer 117 is stopped, the NOR circuit 134 outputs False since True is input from the power supply circuit control signal detection circuit 132 and True is also input from the timer 117. When the backup lamp 70 is turned OFF, the count of the timer 117 has started, and before the preset time has elapsed, the NOR circuit 134 outputs False since False is output from the power supply circuit control signal detection circuit 132 and True is input from the timer 117. When the backup lamp 70 is turned OFF, the count of the timer 117 has started, and after the preset time has elapsed, the NOR circuit 134 outputs True since False is output from the power supply circuit control signal detection circuit 132 and False is input from the timer 117.

The power supply circuit control circuit 136 receives the signal from the NOR circuit 134, and generates a control signal for turning ON the supply of power by the camera power supply circuit 114 and a control signal for turning OFF the supply of power by the camera power supply circuit 114.

When the backup lamp 70 is turned ON and the timer 117 is stopped, as well as when the backup lamp 70 is turned OFF, the count of the timer 117 has started and before the preset time has elapsed, the power supply circuit control circuit 136 receives False from the NOR circuit 134. Therefore, the power supply circuit control circuit 136 generates a control signal to turn ON the supply of power. When the backup lamp 70 is turned OFF, the count of the timer 117 has started and after the preset time has elapsed, the power supply circuit control circuit 136 receives True from the NOR circuit 134. Therefore, the power supply circuit control circuit 136 generates a control signal to turn OFF the supply of power. The power supply circuit control circuit 136 outputs the control signal to the camera power supply circuit 114.

[Circuit Example of Camera 110]

Figure 4:
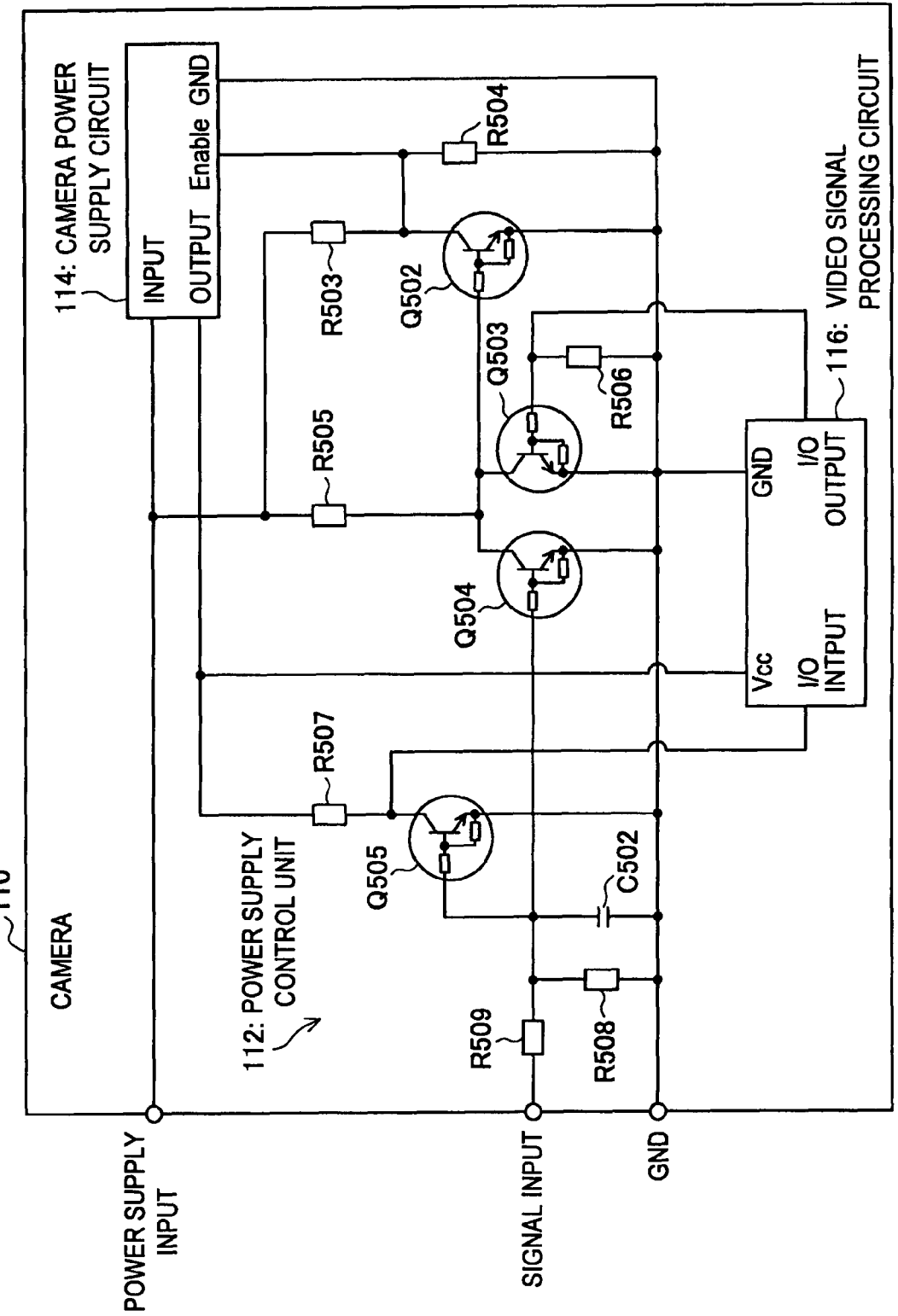
FIG. 4 is a circuit diagram showing a circuit example of the power supply control unit 112 of the camera 110 according to the embodiment.

A circuit example of the power supply control unit 112 of the camera 110 according to the present embodiment will now be described with reference to FIG. 4. FIG. 4 is a circuit diagram showing a circuit example of the power supply control unit 112 of the camera 110 according to the present embodiment.

The camera power supply circuit 114 and the video signal processing circuit 116 are, for example, an IC (Integrated Circuit). The camera power supply circuit 114 includes an INPUT terminal, an OUTPUT terminal, an Enable terminal, and a GND terminal. The video signal processing circuit 116 includes a Vcc terminal, a GND terminal, an INPUT terminal, and an OUTPUT terminal.

The power supply control unit 112 includes resistors R503, R504, R505, R506, R507, R508, R509, a capacitor C502, digital transistors Q502, Q503, Q504, Q505, and the like.

In the camera power supply circuit 114, the INPUT terminal is connected to a power supply input from the battery 30. The OUTPUT terminal is connected to the Vcc terminal of the video signal processing circuit 116 and an output end of the resistor R507. The Enable terminal is connected to an input end of the resistor R504 and to between the output end of the resistor R503 and the collector terminal of the digital transistor Q502. The GND terminal is GND connected.

In the video signal processing circuit 116, the Vcc terminal is connected to the OUTPUT terminal of the camera power supply circuit 114. The GND terminal is GND connected. The INPUT terminal is connected between the input end of the resistor R507 and the collector terminal of the digital transistor Q505. The OUTPUT terminal is connected to the input end of the resistor R506 and the base terminal of the digital transistor Q503.

In the power supply control unit 112, the resistor R503 has the input end connected to the power supply input from the battery 30, and the output end connected to the input end of the resistor R504 and the collector terminal of the digital transistor Q502. The resistor R504 has the input end connected to the Enable terminal of the camera power supply circuit 114 and the output end GND connected. The resistor R505 has the input end connected to the power supply input from the battery 30 and the output end connected to the base terminal of the digital transistor Q502, the collector terminal of the digital transistor Q503, and the collector terminal of the digital transistor Q504. The resistor R506 has the input end connected to the OUTPUT terminal of the video signal processing circuit 116 and the base terminal of the digital transistor Q503, and the output end GND connected.

The resistor R507 has the input end connected to the INPUT terminal of the video signal processing circuit 116 and the output end connected to the OUTPUT terminal of the camera power supply circuit 114. The resistor R508 has the input end connected between the output end of the resistor R509 and the base terminal of the digital transistor Q504, the base terminal of the digital transistor Q505, and the input end of the capacitor C502, and has the output end GND connected. The resistor R509 has the input end connected to the input of the backup lamp signal, and the output end connected to the input end of the resistor R508, the base terminal of the digital transistor Q504, the base terminal of the digital transistor Q505, and the input end of the capacitor C502. The capacitor C502 has the input end connected to the output end of the resistor R509 and the output end GND connected.

The digital transistor Q502 has the base terminal connected to the output end of the resistor R505, and the collector terminal connected to the output end of the resistor R503 and between the Enable terminal of the camera power supply circuit 114 and the input end of the resistor R504. The digital transistor Q503 has the base terminal connected to the OUTPUT terminal of the video signal processing circuit 116 and the input end of the resistor R506, and the collector terminal connected to the output end of the resistor R505, the base terminal of the digital transistor Q502, and the collector terminal of the digital transistor Q504. The digital transistor Q504 has the base terminal connected to the output end of the resistor R509, and the collector terminal connected to the output end of the resistor R505, the base terminal of the digital transistor Q502, and the collector terminal of the digital transistor Q503. The digital transistor Q505 has the base terminal connected to the output end of the resistor R509, and the collector terminal connected to the input end of the resistor R507 and the INPUT terminal of the video signal processing circuit 116. The emitter terminals of the digital transistors Q502, Q503, Q504, Q505 are all GND connected.

<2. Operation of One Embodiment>

Figure 5:
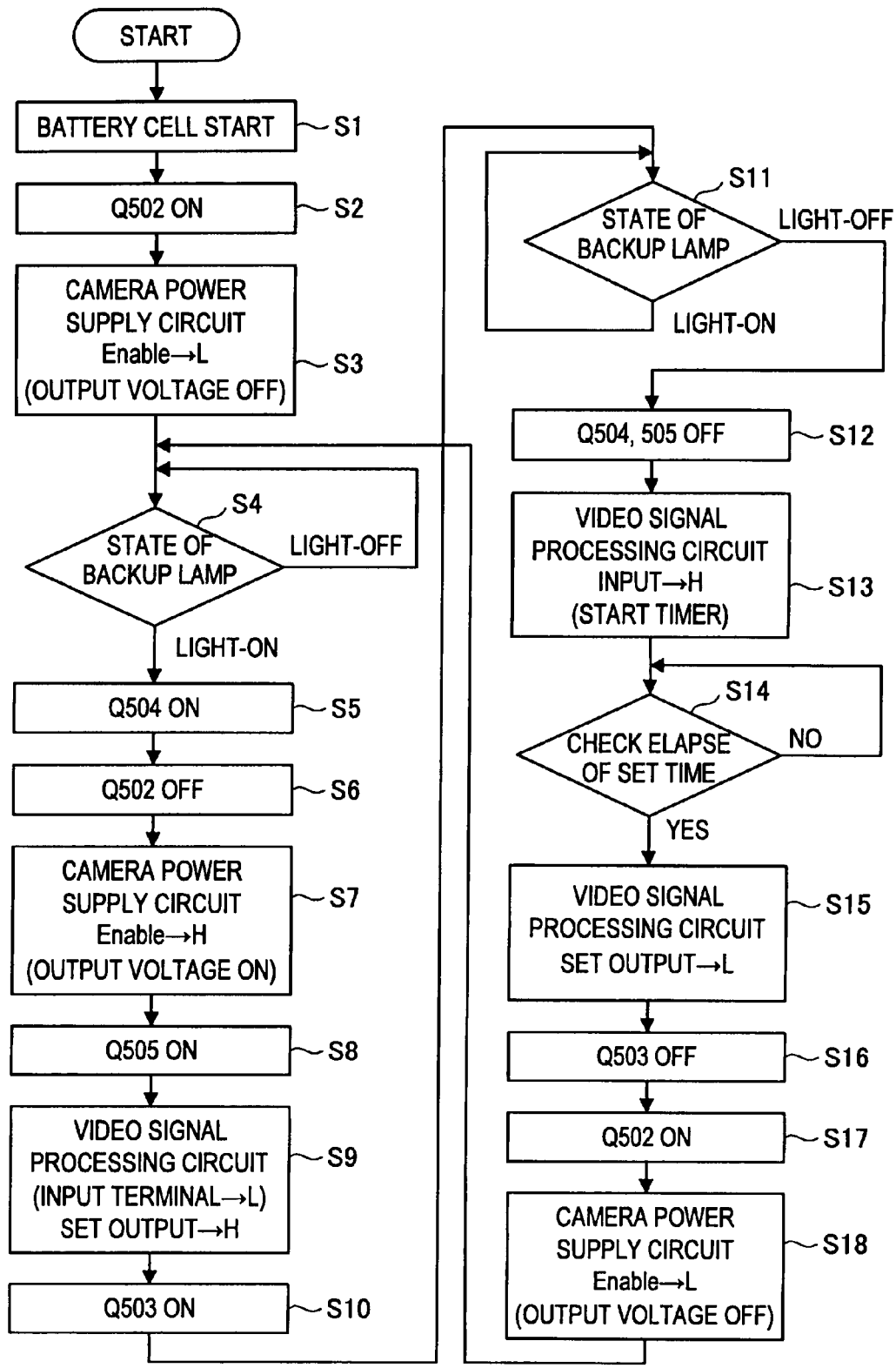
FIG. 5 is a flowchart showing the operation related to the power ON/OFF control of the camera 110 according to the embodiment.
Figure 6:
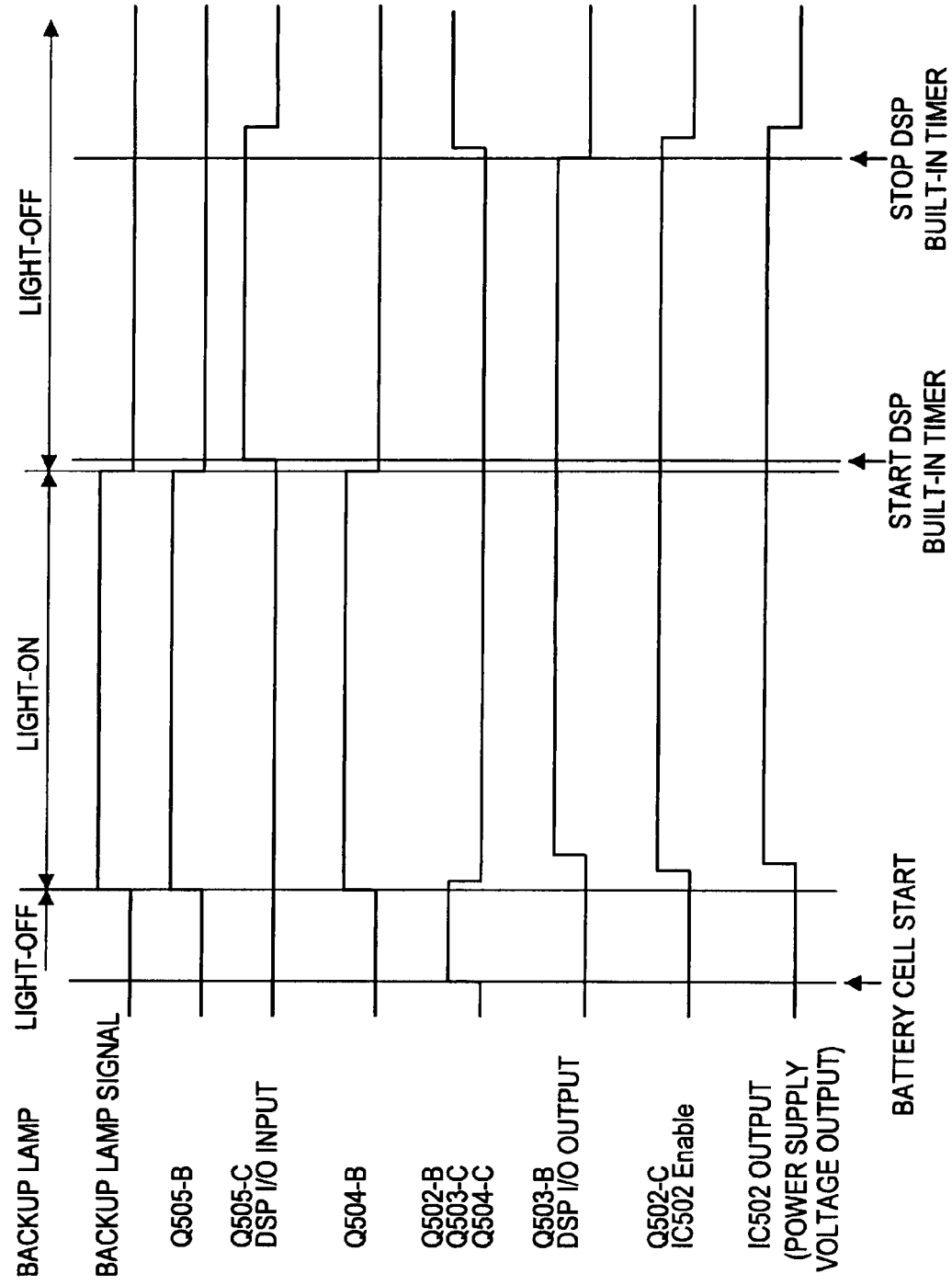
FIG. 6 is a timing chart showing the operation related to the power ON/OFF control of the camera 110 according to the embodiment.
Figure 7:
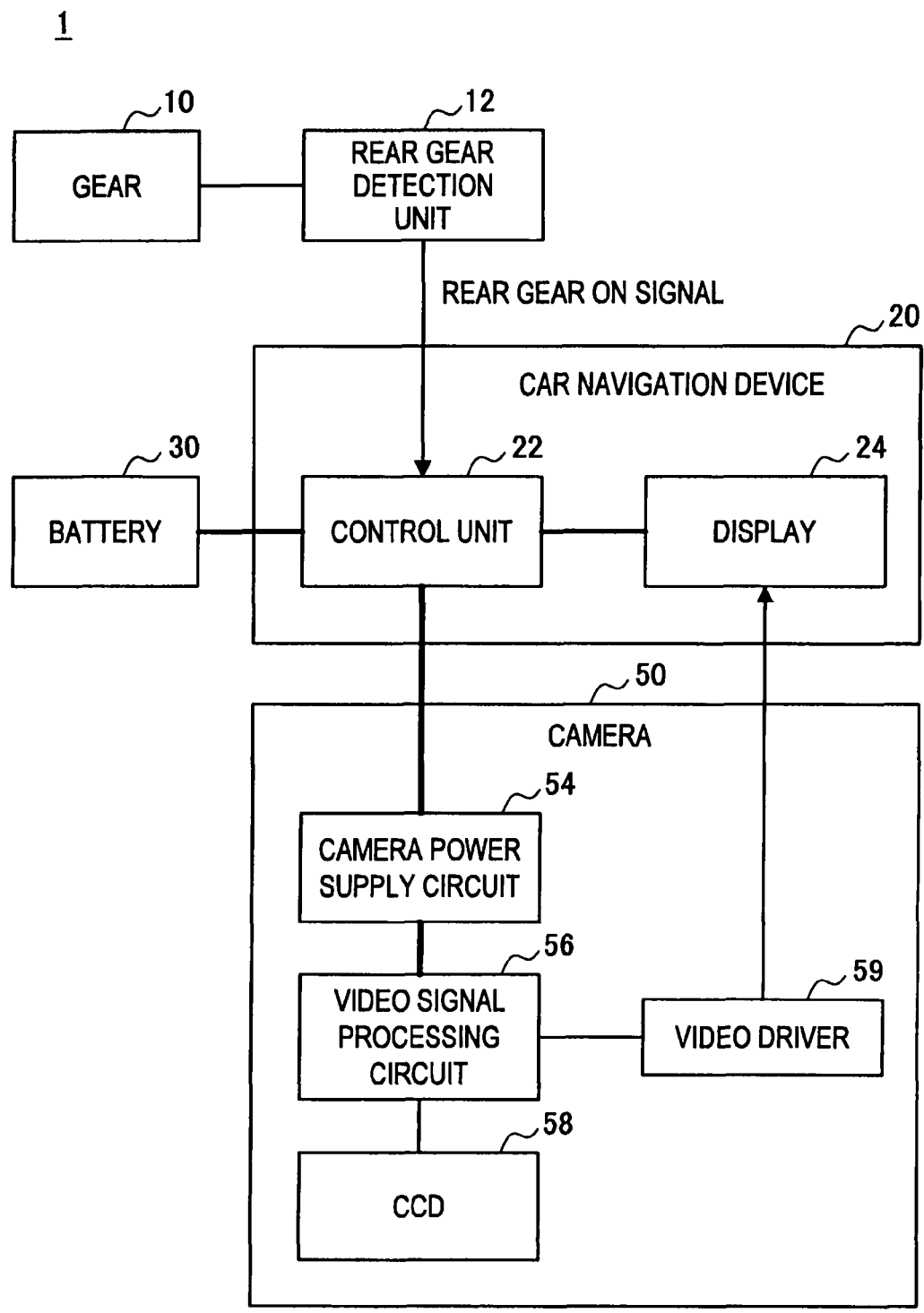
FIG. 7 is a block diagram showing a camera system 1 of the related art.

The operation of the camera 110 will now be described with reference to FIGS. 5 and 6. FIG. 5 is a flowchart showing the operation related to the power ON/OFF control of the camera 110 according to the present embodiment. FIG. 6 is a timing chart showing the operation related to the power ON/OFF control of the camera 110 according to the present embodiment. In FIG. 6, "-B" in the digital transistor Q means the base terminal and "-C" means the collector terminal. Furthermore, in FIG. 6, "DSP" means the video signal processing circuit 116, and "IC 502" means the camera power supply circuit 114.

First, the cell start of the battery 30 will be described. Upon the cell start, the voltage of the battery 30 is applied to the camera 110 (step S1). In this case, the digital transistor Q502 is turned ON (Step S2). The digital transistors Q503, Q504 are turned OFF. The Enable of the camera power supply circuit 114 becomes Low and the output voltage of the camera power supply circuit 114 is turned OFF (step S3).

The camera 110 then detects the state of the backup lamp 70 (step S4), and continues to detect the state of the backup lamp 70 while the backup lamp 70 is turned OFF. When light-on of the backup lamp 70 is detected, the digital transistor Q504 is turned ON (step S5). At this time, the digital transistor Q505 is not operating. The digital transistor Q502 is then turned OFF (step S6). The Enable of the camera power supply circuit 114 then becomes High, and the output voltage of the camera power supply circuit 114 is turned ON (step S7). As a result, the power supply voltage (Vcc) is applied to each constituent element of the camera 110, and the power is supplied.

The video signal processing circuit 116 then starts to operate, and the camera 110 starts to drive. The digital transistor Q505 enters the operation state (ON) at the same time as the power supply voltage (Vcc) is applied (step S8). As a result, the INPUT terminal of the video signal processing circuit 116 remains in the Low state, which state is detected by the video signal processing circuit 116 and the OUTPUT terminal becomes High (step S9). The digital transistor Q503 is then turned ON (step S10).

The camera 110 detects the state of the backup lamp 70 (step S11), and continues to detect the state of the backup lamp 70 while the backup lamp 70 is turned ON. When the light-off of the backup lamp 70 is detected, the digital transistors Q504, Q505 are turned OFF (step S12). In this case, since the digital transistor Q503 is turned ON, and thus the Enable of the camera power supply circuit 114 remains in the High state, and the camera power supply circuit 114 continues to supply power.

When the digital transistor Q505 is turned OFF, the INPUT terminal of the video signal processing circuit 116 becomes High and the timer 117 built in the video signal processing circuit 116 starts to count the elapsed time (step S13). The timer 117 checks whether or not the preset time has elapsed (step S14). Step S14 is repeated until the preset time has elapsed.

After the preset time has elapsed, the OUTPUT terminal of the video signal processing circuit 116 is set to Low (step S15), and the digital transistor Q503 is turned OFF (step S16). The digital transistor Q502 is then turned ON (step S17). The Enable of the camera power supply circuit 114 then becomes Low, and the output voltage of the camera power supply circuit 114 is turned OFF (step S18). As a result, the power supply voltage (Vcc) applied to each constituent element of the camera 110 is turned OFF and the supply of power is stopped.

As described above, the present embodiment can realize the function of turning ON/OFF the power supply incorporated in the camera 110 by combining the functions of the circuit for detecting light-on or light-off of the backup lamp 70 and the microcomputer of the video signal processing circuit (DSP) 116 inside the camera 110. When the backup lamp 70 is turned ON, the camera 110 turns ON its power supply, so that the video signal is consequently output and the video is displayed on the display 40. When the backup lamp 70 is turned OFF, the camera 110 turns OFF its power supply after a set time has elapsed. The camera 110 is operated and the video is displayed on the display 40 for a few seconds to more than a dozen seconds after the backup lamp 70 is turned OFF so that the driver can check the back side of the automobile 100 with the video taken by the camera 110 for awhile even after the backward movement of the automobile 100 is stopped. The time until the camera 110 is turned OFF after the backup lamp 70 is turned OFF can be freely set by the timer 117 built in the microcomputer of the video signal processing circuit (DSP) 116, and the like.

Figure 8:
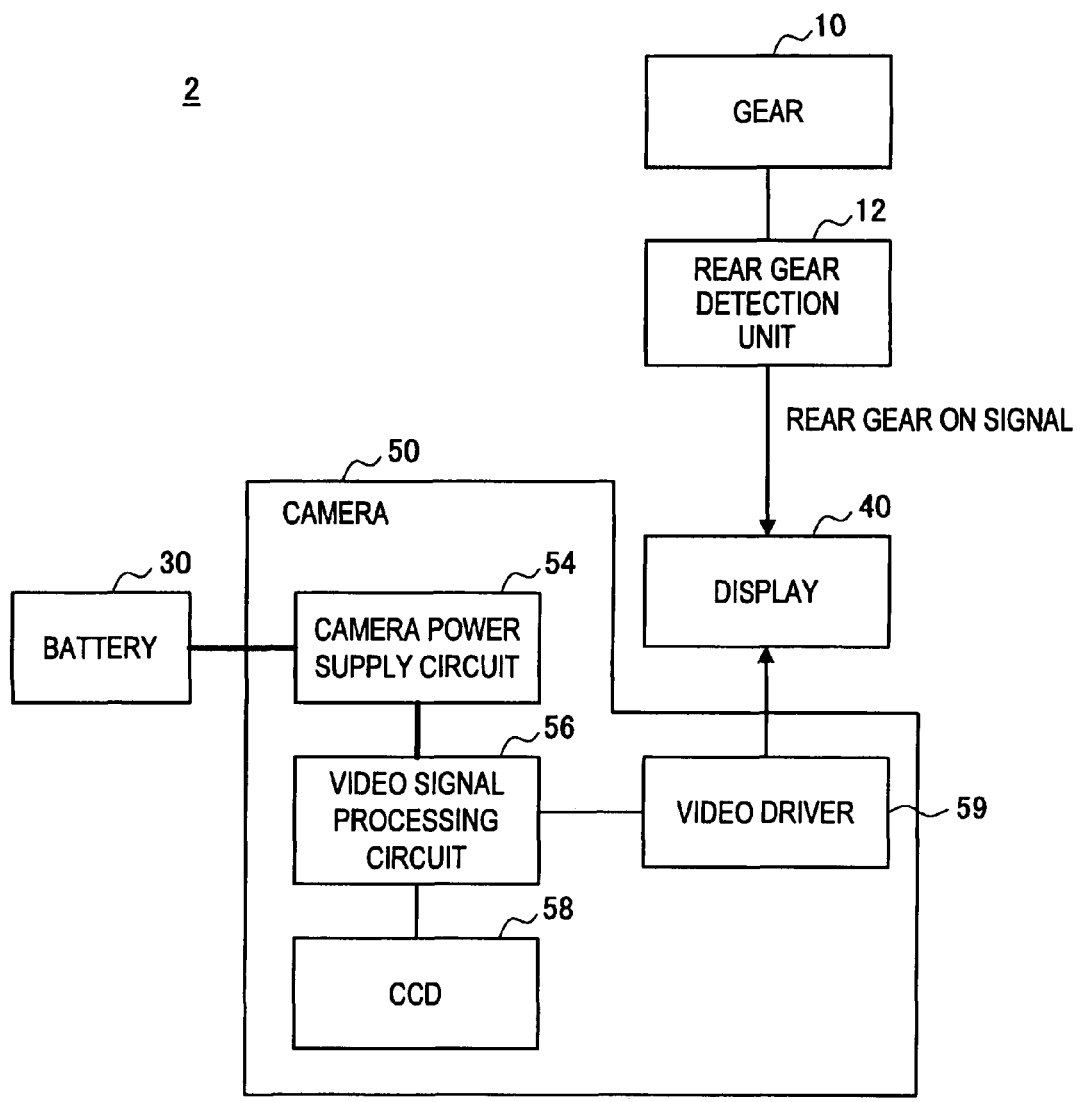
FIG. 8 is a block diagram showing a camera system 2 of the related art.
Figure 9:
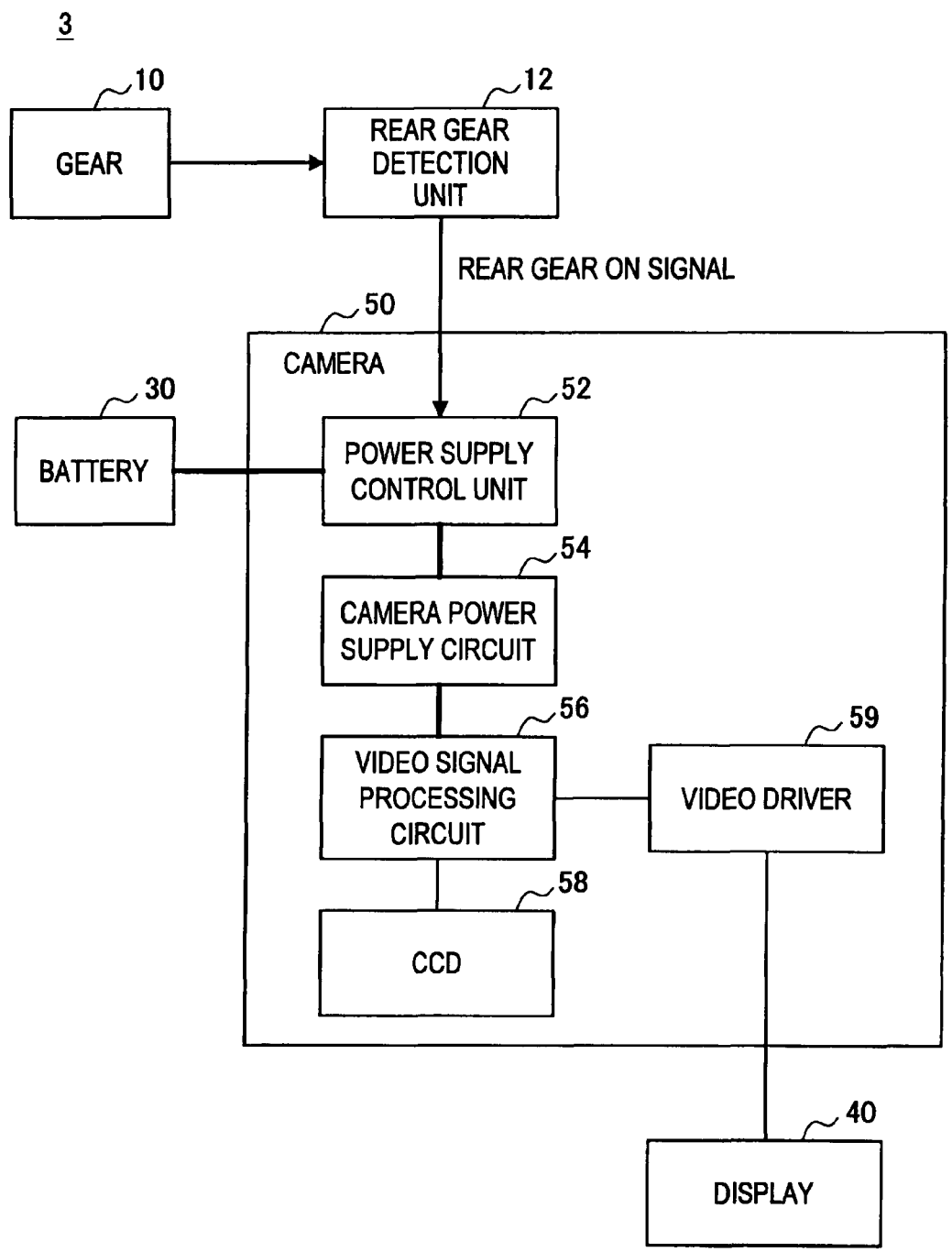
FIG. 9 is a block diagram showing a camera system 3 of the related art.

According to the present embodiment, only the power supply control unit 112 of the camera 110 is conducted on a steady basis, and the camera power supply circuit 114 is not conducted on a steady basis as opposed to the related art example shown in FIG. 8. As a result, energy can be saved and the load on the battery 30 can be alleviated. Furthermore, the lifespan of the camera 110 itself becomes longer as the conduction time is shortened. Moreover, the reliability of the camera 110 can be enhanced since the temperature rise inside the camera 110 can be suppressed.

The camera 110 and the camera system including the camera 110 may not need the external device such as the car navigation device, where the camera 110 can be installed in the automobile not mounted with the car navigation device and the power ON/OFF control of the camera 110 can be easily carried out.

In the present embodiment, the power supply of the camera 110 is turned ON and OFF with the signal from the backup lamp 70 as a trigger in view of the wiring of the signal cable in the automobile 100. In other words, the present embodiment can shorten the cable length of the signal cable compared to when detecting the rear gear of the gear and turning ON and OFF the power supply of the camera.

Figure 10:
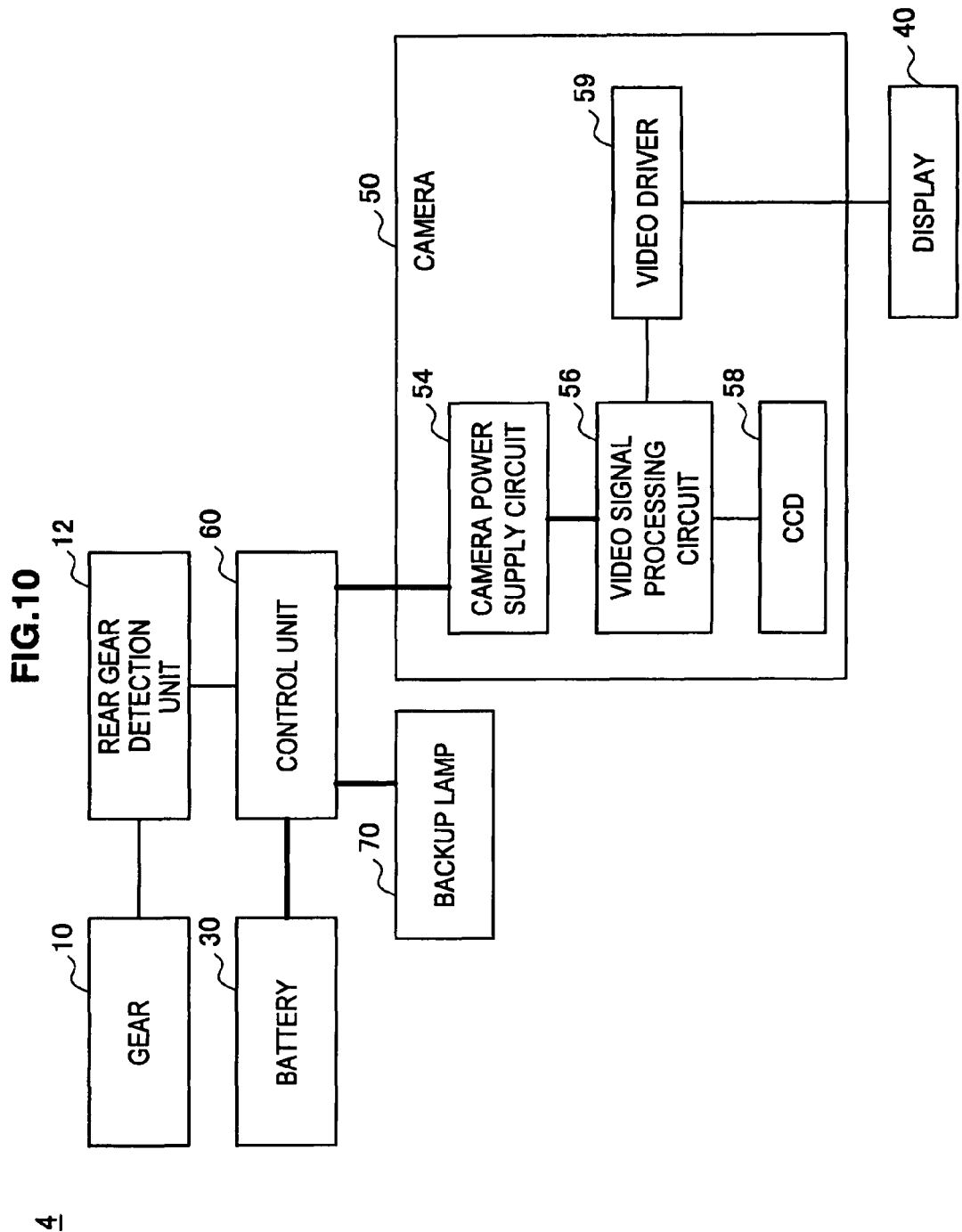
FIG. 10 is a block diagram showing a camera system 4 of the related art.

The power supply of the camera 110 according to the present embodiment is directly supplied with power from the battery 30 without sharing with the backup lamp 70. FIG. 10 shows a camera system 4 of when the power supply of the camera 110 is shared with the backup lamp 70, as opposed to the present embodiment. FIG. 10 is a block diagram showing the camera system 4 of the related art.

In the camera system 4, the control unit 60 performs the ON/OFF control of the backup lamp 70 and the ON/OFF control of the power supply of the camera 50 based on the rear gear ON signal. In such example shown in FIG. 10, the camera 50 may influence the control of light-on and light-off of the backup lamp 70, which poses the issue of ensuring safety. In the present embodiment, the issue of safety can be avoided since the power supply of the camera 110 is directly supplied with power from the battery 30 without sharing with the backup lamp 70.

In the example shown in FIG. 10, the ON/OFF of the backup lamp 70 and the ON/OFF of the camera 50 are simultaneously controlled. Thus, the control of turning OFF the camera 50 after the backup lamp 70 is turned OFF and the preset time has elapsed, as in the present embodiment, may not be carried out. According to the present embodiment, on the other hand, the ON/OFF of the camera 110 can be controlled independent from the ON/OFF of the backup lamp 70.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging device comprising:
   an imaging element for receiving light from a subject and converting the light to an electric signal;
   a video signal processing circuit for performing signal processing on a video signal generated based on the electric signal;
   a power supply circuit for supplying power to the video signal processing circuit;
   a signal detection unit for receiving a backup lamp signal indicating light-on or light-off of a backup lamp from the backup lamp installed at a back part of a vehicle; and
   a power supply control unit for controlling the power supply circuit based on the backup lamp signal so that the supply of power is turned ON in response to receipt of the backup lamp signal indicating the light-on of the backup lamp and is kept turned ON thereafter during a remaining time of light-on of the backup lamp and for at least a preset time after receipt of the backup lamp signal indicating a next light-off of the backup lamp such that the power is supplied to the video signal processing circuit so as to enable the signal processing on the video signal to be performed (i) after the receipt of the backup lamp signal indicating the light-on of the backup lamp and (ii) during at least the preset time after receipt of the backup lamp signal indicating the backup lamp is light-off, and the supply of power is turned OFF thereafter.

2. The imaging device according to claim 1, further comprising:
   a timer for counting an elapsed time after the light-off of the backup lamp based on the backup lamp signal, and outputting a time elapse signal indicating that the preset time has elapsed to the power supply control unit,
   wherein the power supply control unit controls the power supply circuit based on the time elapse signal.

3. The imaging device according to claim 2,
   wherein the timer is arranged in the video signal processing circuit.

4. The imaging device according to claim 1,
   wherein the power supply circuit is arranged while connected to an external battery, and turns ON an output voltage when turning ON the supply of power and turns OFF the output voltage when turning OFF the supply of power.

5. The imaging device according to claim 1,
   wherein the preset time has a value of more than one second.

6. The imaging device according to claim 1, further comprising a timing device to enable the preset time to be set.

7. The imaging device according to claim 1, wherein the preset time has a value of more than twelve seconds.

8. The imaging device according to claim 1, further comprising a video driver to receive the video signal processed by the processing circuit and to generate therefrom a display video signal and to output the display video signal for reception by a display device so as to enable display thereat such that a video corresponding to the display video signal is enabled to be displayed on the display device while the backup lamp is indicated to be light-on and during at least the preset time after the backup lamp is indicated to be light-off.

9. A power supply control method of an imaging device, comprising the steps of:

- a signal detection unit receiving a backup lamp signal indicating light-on or light-off of a backup lamp from the backup lamp installed at a back part of a vehicle;
- a power supply circuit turning ON supply of power with respect to a video signal processing circuit, which performs signal processing on a video signal generated based on an electric signal converted by an imaging element upon receiving light from a subject, in response to receipt of the backup lamp signal indicating the light-on of the backup lamp based on the backup lamp signal;
- the power supply circuit keeping the supply of power turned ON during a remaining time of the light-on of the backup lamp and for at least a preset time after receipt of the backup lamp signal indicating a next light-off of the backup lamp such that the power is supplied to the video signal processing circuit so as to enable the signal processing on the video signal to be performed (i) after the receipt of the backup lamp signal indicating the light-on of the backup lamp and (ii) during at least the preset time after receipt of the backup lamp signal indicating the backup lamp is light-off; and the power supply circuit turning OFF the supply of power with respect to the video signal processing circuit thereafter.

\* \* \* \* \*